Nov. 12, 1940.   G. H. ARNOLD   2,221,564
SAFETY CONTROL DEVICE FOR GAS GOVERNORS
Filed June 3, 1939   2 Sheets-Sheet 2
Fig. 4.
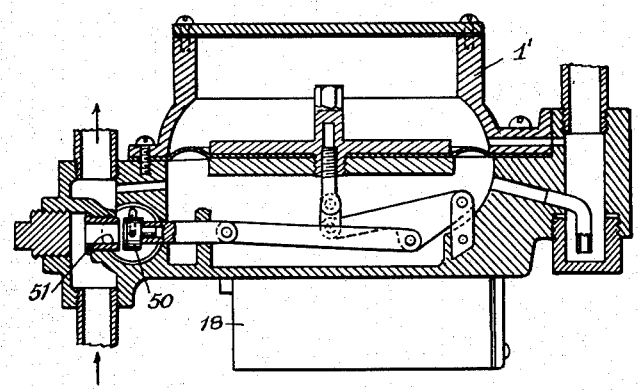
Fig. 5.
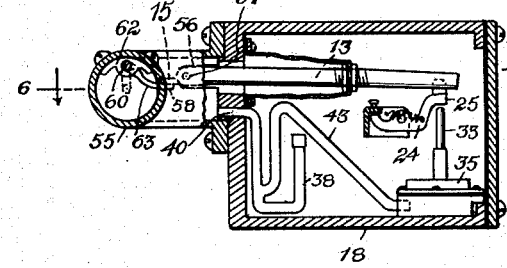
Fig. 6.
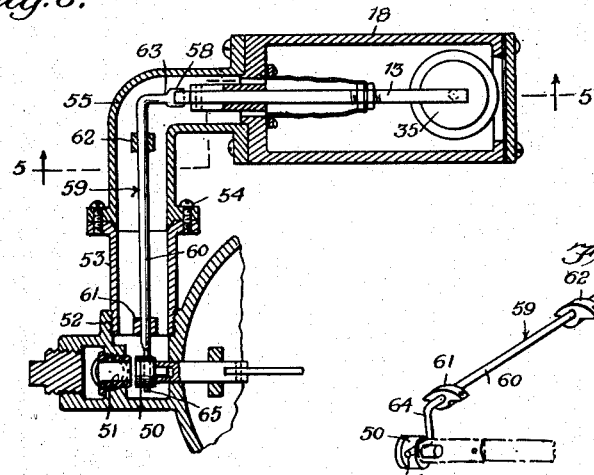
Fig. 7.
INVENTOR
George H. Arnold
BY
Munn, Anderson & Liddy
ATTORNEYS
WITNESSES Patented Nov. 12, 1940

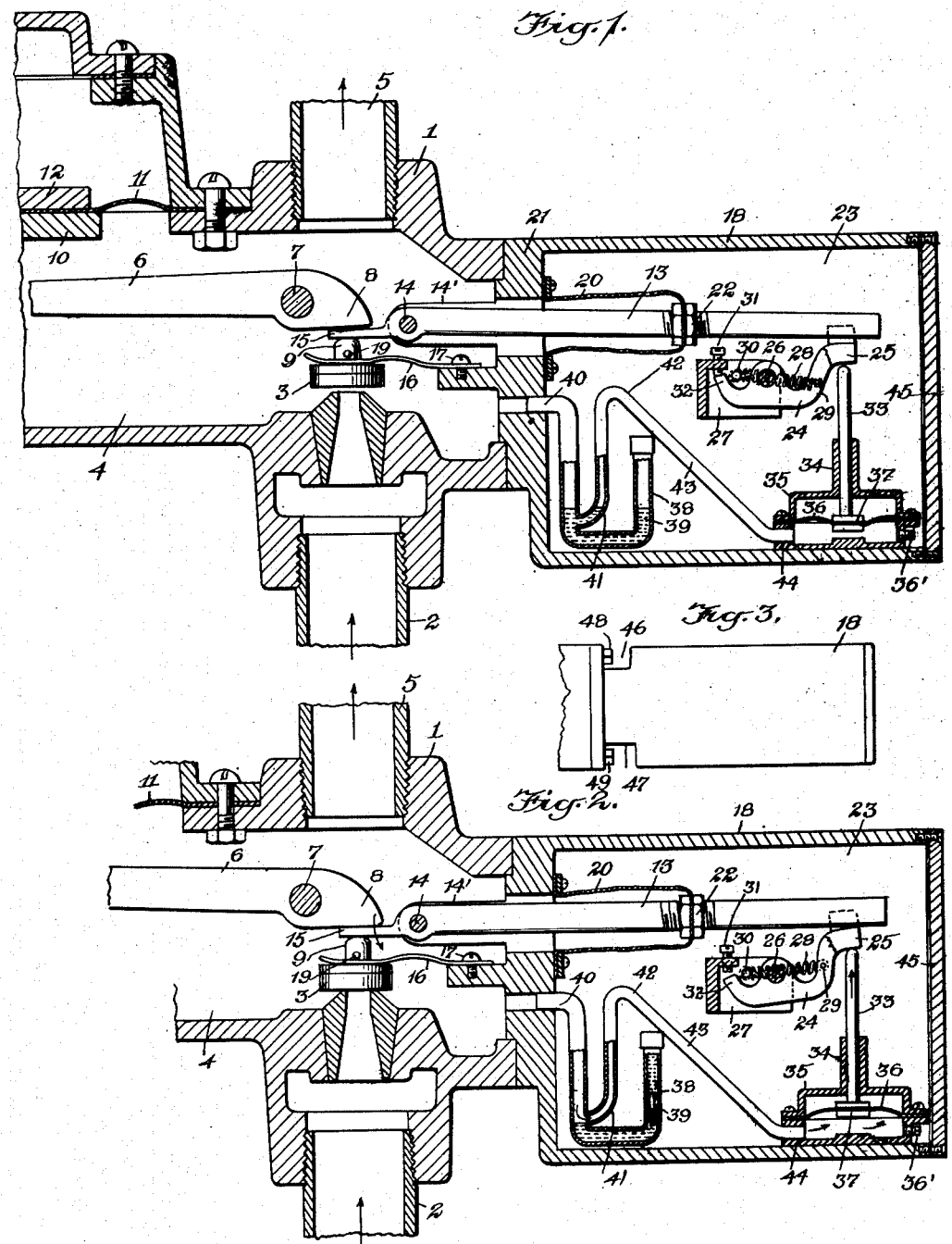

2,221,564

UNITED STATES PATENT OFFICE 2,221,564

SAFETY CONTROL DEVICE FOR GAS GOVERNORS

George H. Arnold, Babylon, N. Y.

Application June 3, 1939, Serial No. 277,330

5 Claims. (Cl. 50—5)

This invention relates to control devices for governors or pressure regulators and particularly to an improved safety control device for gas governors used in connection with dwellings or other buildings to shut off the flow of gas when the pressure reaches a predetermined point, an object being to provide a construction which will automatically operate to shut off the gas but which requires manual actuation to turn on the gas.

Another object of the invention is to provide a safety control for gas governors which may be built into the governor or attached to the governor casing either at the end or at the side according to the particular type of governor.

A further object, more specifically, is to provide a control for gas governors which will quickly shut off the inflow of gas when the pressure in the governor reaches a predetermined point.

In the accompanying drawings—

Fig. 1 is a vertical sectional view through part of a well-known gas governor now in common use and a safety control therefor disclosing an embodiment of the invention;

Fig. 2 is a view similar to Fig. 1 but showing the parts in a closing position;

Fig. 3 is a top plan view of the control device shown in Fig. 1, the same being on a reduced scale and illustrating a connection of the casing of the control device with the casing of the gas governor;

Fig. 4 is a vertical sectional view through a different form of gas governor to that illustrated in Fig. 1, wherein the inspection plate is arranged on the side;

Fig. 5 is a sectional view through Fig. 6 approximately on the line 5—5, the same illustrating a modified construction to that shown in Fig. 1 and showing how the same is associated with the governor illustrated in Fig. 4;

Fig. 6 is a sectional view through Fig. 5 approximately on the line 6—6;

Fig. 7 is a perspective view of the actuating structure shown in Fig. 6.

Referring to the accompanying drawings by numerals, 1 indicates a well-known form of gas governor or pressure regulator used in connection with dwellings and other buildings. The gas enters through a pipe 2 and raises a valve 3 so as to fill a chamber 4. From chamber 4 gas flows through an outlet pipe 5 to the various gas outlets being supplied with gas, as for instance, gas stoves, gas burners, and the like. The governor or pressure regulator 1 is provided with a lever arm 6 pivotally fulcrumed at 7 so that the end 8 may press downwardly on an extension 9 of valve 3 for closing the same. Lever 6 is connected with a lever plate 10 secured to a diaphragm 11, which diaphragm is provided with an upper plate 12. In addition, the governor 1 is provided with a mercury seal cup (not shown) which is adapted to blow out when the pressure in chamber 4 exceeds a certain pressure. It is to be understood that the governor or pressure regulator 1 just described is old and well known and the detail structure thereof forms no part of the present invention. However, it has been found that quite often the mercury from the governor or pressure regulator 1 blows out and gas escapes continuously for a long period of time before it is noticed. This produces a loss of the mercury and the gas, as well as presenting a structure which is liable to be injurious to the health of persons living or working in the vicinity and particularly in the house or building where the governor or pressure regulator is located. To prevent the pressure in chamber 4 from becoming sufficiently high to blow the mercury from governor 1, the control device shown at the right in Fig. 1 has been provided. This control device may be set to function at any pressure. If it should take twelve inches water column pressure in chamber 4 to blow the mercury seal from governor 1, then the control device shown at the right in Fig. 1 should be set to function at eight to ten inches water column pressure.

As illustrated particularly in Fig. 1, it will be seen that there is provided a lever arm 13 which is journaled or fulcrumed at 14 on a suitable pin. The end of lever 13, shown at 15, is projected from the fulcrum at the end of lever 13, the said projection extending between the end 8 of the lever arm 6 and the extension 9 of valve 3. Whenever the lever arm 13 is swung upwardly, the extension 15 will move the valve 3 downwardly and close the same. A spring 16 is secured at 17 to a suitable lug or extension from the control casing 18 and loosely surrounds the extension 9 but connected thereto by reason of valve 3 and held against moving upwardly therefrom by a pin 19. Ordinarily the diaphragm 11 will cause the arm 6 to function to close the valve 3, but some times after long usage diaphragm 11 fails to function, but more frequently dirt or grit accumulates on valve seat and prevents its closing, so that the pressure will build up and blow out the mercury in the safety mercury seal cup. Tests prove that when control operates, the pressure exerted by spring 28 through lever 13 on valve 3 closes the valve tight under all conditions.

For this reason the control is desirable. A boot gasket 20 is secured to the end 21 of casing 18 and by clamping nuts 22 to the lever arm 13. This allows a free swinging up-and-down movement of arm 13 without allowing any of the gas from the chamber 4 to pass into the chamber 23 formed by casing 18. When the governor or pressure regulator 1 is functioning in the usual manner the lever 13 is in its lowered position, as shown in Fig. 1, and also the balanced arm 24 is in its lowered position. This arm at one end is provided with a substantially horizontal section 25 arranged slightly below the arm 13. A pivot member 26 carried by a stationary support 27 supports arm 24. A contractile spring 28 is connected at 29 to arm 24 and at 30 to support 27. The parts are arranged so that the arm 24 will be past dead center when in non-functioning position, as shown in Fig. 1. An adjusting screw 31 is provided in support 27 and acts against the end 32 of arm 24 to vary the position thereof. A plunger 33 extends to a point almost in contact with the lower surface of the extension 25 when the safety control device is not functioning and this plunger slidingly extends through a guiding member 34 into the casing 35. A diaphragm 36 is arranged in the casing and plunger 33 at 37 rests on a disk secured to the diaphragm. This casing, diaphragm and plunger form a power element actuated by gas pressure when the pressure in chamber 4 reaches a predetermined point.

It will be observed there is provided a U-tube 38 containing mercury 39. This tube has an extension or pipe 40 opening into chamber 4 and has an auxiliary pipe 41 preferably of less diameter than the pipes forming the U-tube 38. Pipe 41 preferably extends above the entrance of extension 40, where it is bent at 42 and merges into a continuously inclined portion 43, which at 44 is secured to casing 35 and is in free communication with the space below diaphragm 36.

When the parts are in the position shown in Fig. 1 and the pressure in chamber 4 exceeds a certain pressure, the gas entering through the extension 40 will force the mercury 39 in the pipes 40 and 41 downwardly until there is a free communication between these two pipes as shown in Fig. 2. This will allow the gas to quickly fill the lower part of casing 35 and act on diaphragm 36 for quickly raising the plunger 33 which will strike the extension 25 and move the same upwardly sufficiently to cause spring 28 to further swing the arm 24, as illustrated in Fig. 2, whereby the arm 13 will be swung upwardly as far as the extension 15 will permit. This will quickly and firmly close valve 3 even though the lever 6 in the governor does not function. When lever 6 is functioning normally, the arm 13 will swing upwardly as valve 3 is closed by lever 6 and again downwardly as the valve opens, but the other parts of the safety control will not function. In view of this fact, the normal operation of valve 3 is not affected by lever 13. However, when the lever 6 fails to function and the safety control device functions for closing valve 3, it will remain in its full functioning position, as shown in Fig. 2, until manually reset.

When the parts have been moved to the position shown in Fig. 2 and the pressure in chamber 4 is reduced, mercury 39 will move from the position shown in Fig. 2 to that shown in Fig. 1, but arm 13 will not allow valve 3 to open. An inspector or other person may remove the door 45 and manually push downwardly the lever 13 until balance arm 24 is in open position as shown in Fig. 1. The parts thus being reset, will remain reset until the pressure in chamber 4 causes the same to function again. When the safety control functions, the inspector will naturally realize that governor 1 is out of order and before resetting the safety control device he will repair or readjust governor 1 so that it will function properly. In this way as the gas pressure moves up and down the valve 3 is closed from time to time by lever 6 and then automatically opened as the pressure reduces.

When the mechanism of governor 1 fails to function properly and before the mercury in the seal cup of governor 1 blows out, the safety control device will function and remain in functioning position until manually reset. As shown in Fig. 3, the casing 18 is provided with cutaway portions 46 and 47 so that the screws 48 and 49 may be used for clamping the casing to the casing of the governor 1 at the point ordinarily used by the inspection plate.

In the construction shown in Figs. 1 to 3 inclusive, it will be observed that the safety control device is connected to that type of governor which has an inspection plate at the end. The same inventive concept and substantially the same structure may be used with governors having inspection openings at other places, as for instance in one side, as illustrated in Figs. 4 to 6 inclusive. Referring to these figures, it will be understood that the governor 1' is an old and well-known structure and has a valve member 50 arranged to move toward and from its seat 51. In this form of governor the inspection plate is screwed into an internally threaded boss 52, as shown in Fig. 6. This plate is removed in order to apply the safety control embodying the invention. As illustrated in Fig. 6, the tubular member 53 is screwed into the boss 52 and is secured by suitable screws 54 to an L-shaped tube 55 secured by screws or otherwise to casing 18. The casing 18 in this form of the invention and all the parts thereof are identical with those shown in Fig. 1 and, therefore, will need no additional description. The extension 15 of the lever arm 13 in this form of the invention rests on the widened portion 58 of a control structure 59. This control structure (Fig. 7) is provided with a main body 60 adapted to rock back and forth in suitable bearings 61 and 62 secured to the respective tubular members 53 and 55. At one end the member or rock shaft is provided with an extension or arm 63 merging into the widened part 58 and at the other end is provided with a crank structure 64 having a portion 65 from which is suspended the valve 50 so as to move this valve against the seat 51 when the lever arm 13 is swung upwardly. In this form of the invention the valve 50 may move toward and from its seat freely under the action of the usual mechanism of governor 1' and this normal movement of the valve will not be affected by arm 13 and associated parts, but when lever arm 13 is actuated by arm 24 the lever arm 13 will be raised and then valve 50 will not open until the parts have been manually reset.

In case any of the mercury passes down into the chamber below diaphragm 36, the inspector or other person may remove the same by removing plug 36'. After the mercury has been removed and replaced in the U-tube 38 the plug is replaced and the device is again in functioning condition.

While the foregoing specification sets forth the invention in specific terms, it is to be understood that numerous changes in shape, size and materials may be resorted to without departing from the spirit and scope of the invention as claimed hereinafter.

I claim:

1. A safety control device for gas governors comprising a valve arm, means for pivotally mounting said arm intermediate its length, a pivotally mounted actuating arm positioned to engage and swing said valve arm to an actuated position, a spring acting on said actuating arm for assisting in moving the actuating arm to a functioning or nonfunctioning position and holding the actuating arm resiliently in either position, a reciprocating plunger for starting the movement of said actuating arm toward a functioning position, a gas pressure actuated member for actuating said plunger, a tubular member having a U-tube intermediate its length for supplying gas under pressure to said gas pressure actuated member, a substantially U-shaped branch having one end in free communication with the curved end of said U-tube and the other end closed or vented and a supply of mercury or other material normally partly filling said branch and said U-tube whereby gas passing through said U-tube must be under a pressure sufficient to force said mercury or other material into said branch before it can pass to said pressure actuated member.

2. A safety control device for a gas governor comprising a valve arm, means for pivotally mounting said valve arm intermediate its length, means including a reciprocating plunger for causing said valve arm to swing to a functioning position, a gas pressure actuated member for actuating said plunger, a tubular member having a U-tube intermediate its length for supplying gas under pressure to said gas pressure actuated member, a substantially U-shaped branch having one end in free communication with the curved end of said U-tube and the other end closed or vented and extending to a point appreciably above said curved end, and a supply of mercury or other material normally partly filling said U-tube and said branch whereby gas passing through said U-tube must be under a pressure sufficient to force said mercury into said branch before it can pass to said pressure actuated member.

3. A safety control device for a gas governor provided with a reciprocating valve adapted to be opened by gas pressure and closed by a movement against the valve pressure, comprising a valve arm pivotally mounted intermediate its length, one end of said arm being positioned immediately above said valve whereby when said end is swung downwardly the valve will be closed and the opposite end of said arm will be elevated, a boot washer connected with said arm intermediate its length for permitting a swinging movement of the arm without allowing any gas to pass from the interior of the governor to the safety control device, a swinging arm for actuating the first-mentioned arm to move the same to a functioning position for closing said valve, a spring acting on the last-mentioned arm for holding said last-mentioned arm in either a functioning or a non-functioning position, a power element positioned to move the last-mentioned arm until the spring associated therewith begins to function, said power element including a diaphragm, a pipe leading from the interior of said governor to a position adjacent the diaphragm directing gas under pressure against the diaphragm for causing the power element to function, means associated with said pipe forming a U-tube, and a supply of mercury or other material in said tube and normally in part of said pipe for preventing the passage of gas through said pipe whereby when the gas in said governor reaches a predetermined pressure the mercury will be forced out of said pipe into said U-tube and some of the gas allowed to pass to said power element to cause said diaphragm to function.

4. A device of the character described including a casing having a pair of openings at one end and a pair of lugs arranged adjacent said openings extending outwardly away from the casing, a spring guide carried by one of said lugs, an arm pivotally mounted on the other of said lugs, said arm extending through one of said openings into said casing, a boot washer secured at one end to said arm and at the other end to said casing around the opening through which said arm extends, and means for swinging said arm upwardly, said arm including a reciprocating rod or plunger, a diaphragm for actuating said rod or plunger, a tubular member having one end fitted into the other of said openings for directing gas to a point adjacent said diaphragm for causing the diaphragm to move said rod or plunger, and a U-tube interposed in said tubular member and a supply of mercury or other material in said U-tube, said mercury or other material extending into said tubular member for normally preventing the passage of gas therethrough.

5. A safety control device for gas governors having an inspection opening at one side and a reciprocating valve adjacent said opening, an L-shaped tubular member having one end fitted into said opening, a housing carried by the other end of said L-shaped tubular member, a rock shaft rockably mounted in the long leg of said L-shaped tubular member, said rock shaft at one end provided with a widened portion and at the other end with a crank with a means engaging said valve for moving the valve to a closed position when the rock shaft has been rocked in one direction, an arm pivotally mounted intermediate its ends and carried by said casing, one end of said arm being arranged adjacent said widened portion, and means in said casing for swinging said arm to a functioning position when the gas pressure in the governor has reached a predetermined pressure whereby said rock shaft will be rocked in a direction for closing said valve.

GEORGE H. ARNOLD.